(No Model.) 6 Sheets—Sheet 5.
F. C. BOYD & R. MARTIN.
FARE REGISTER.
No. 479,388. Patented July 19, 1892.
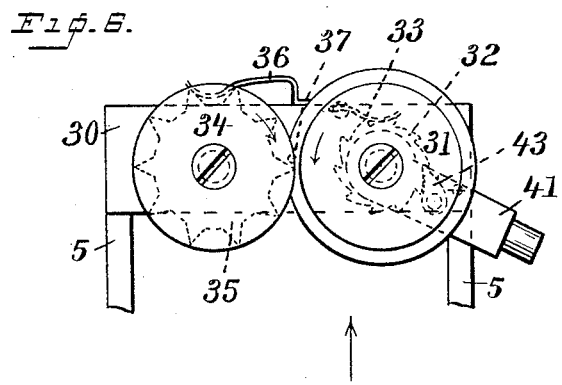
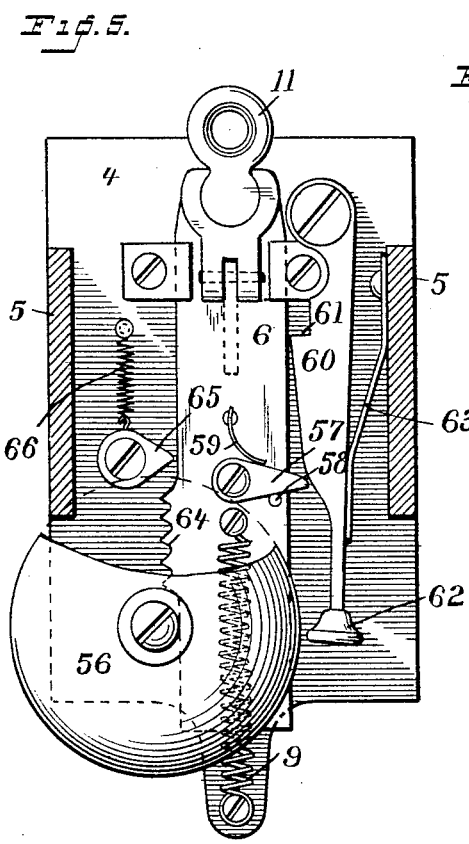
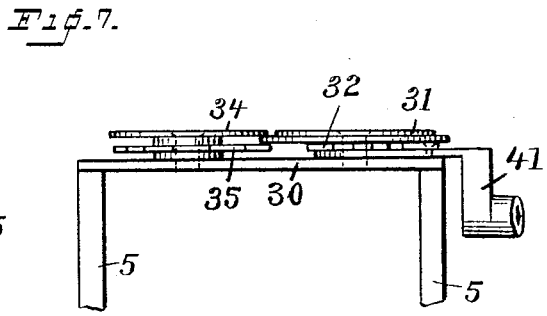
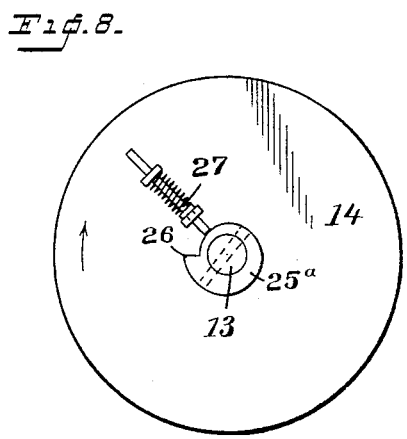
WITNESSES
C. M. Newman,
M. C. Hinchcliffe
INVENTORS
Frederick C. Boyd
Richard Martin
by their attorney
J. N. Hubbard (No Model.) 6 Sheets—Sheet 6.
F. C. BOYD & R. MARTIN.
FARE REGISTER.
No. 479,388. Patented July 19, 1892.
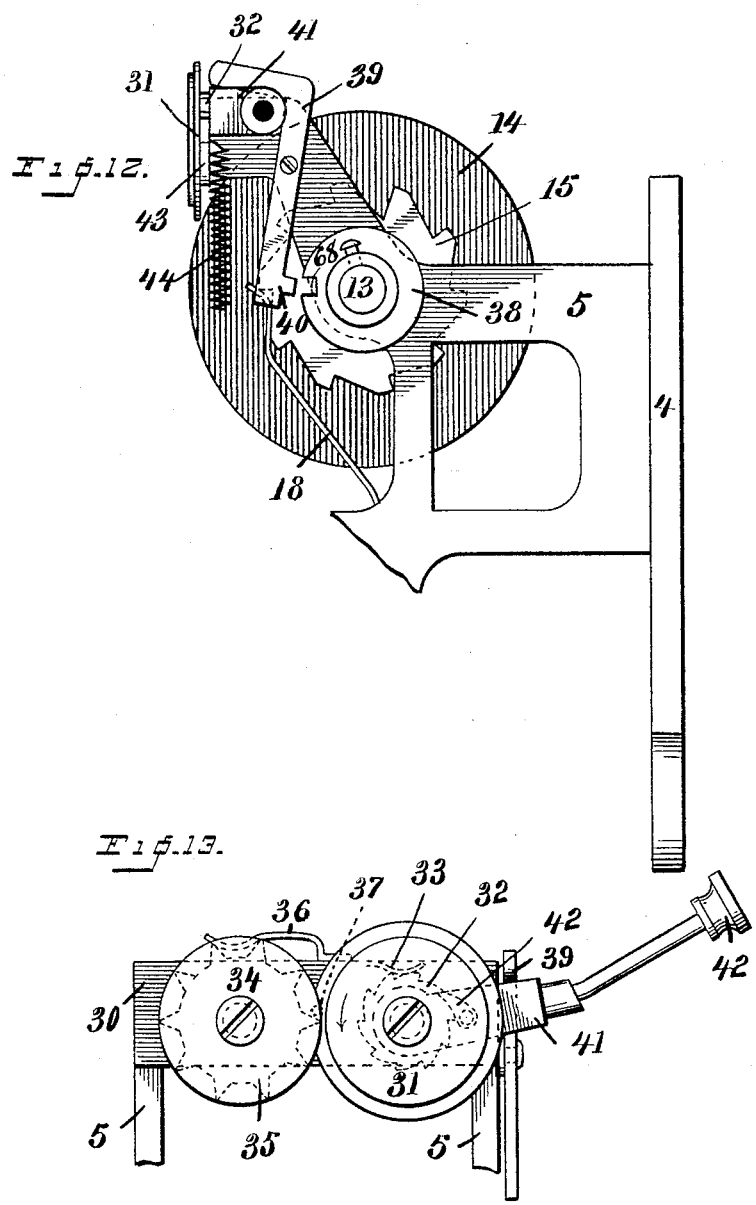
WITNESSES:
C. M. Newman
A. J. Tanner
INVENTORS
Frederick C. Boyd
Richard Martin
BY
D. H. Hubbard
ATTORNEY

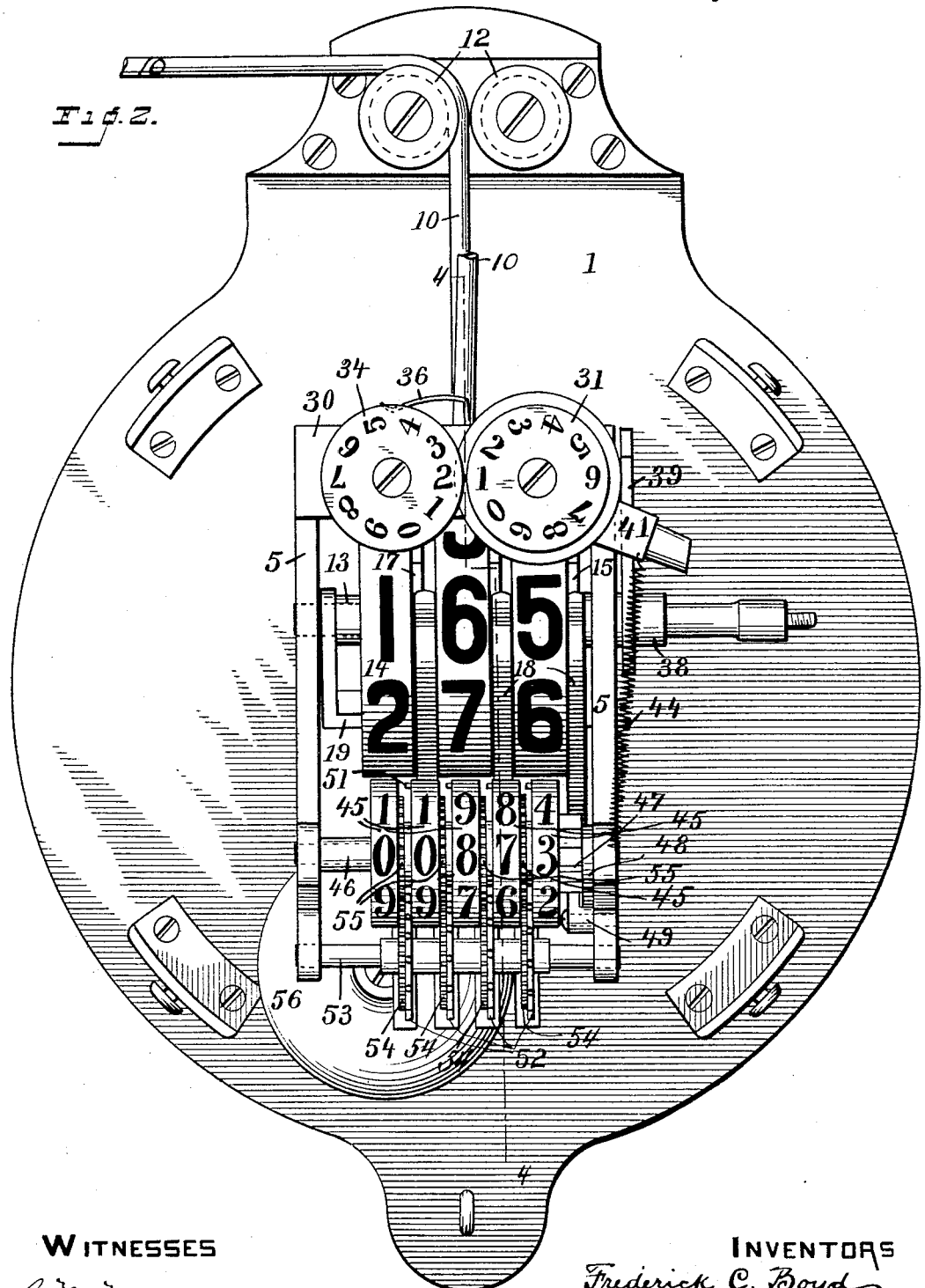

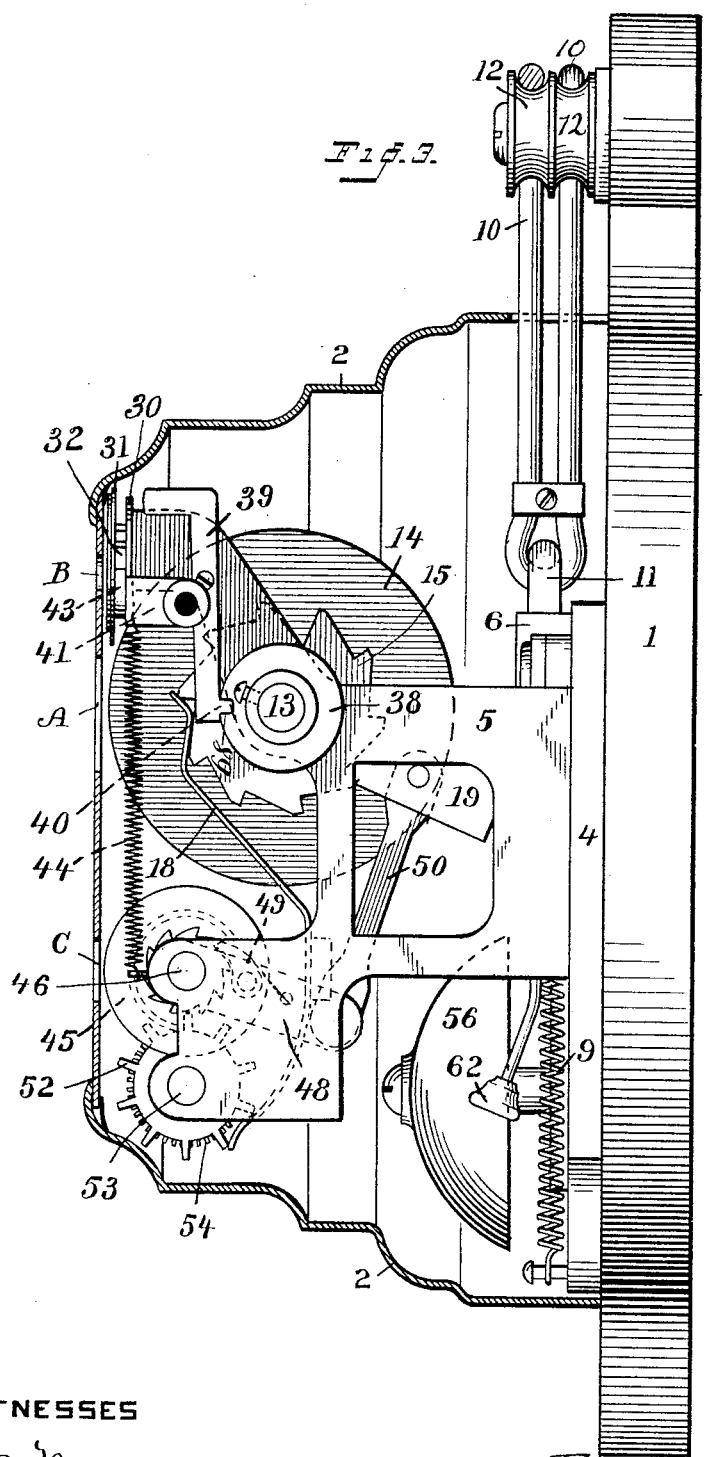

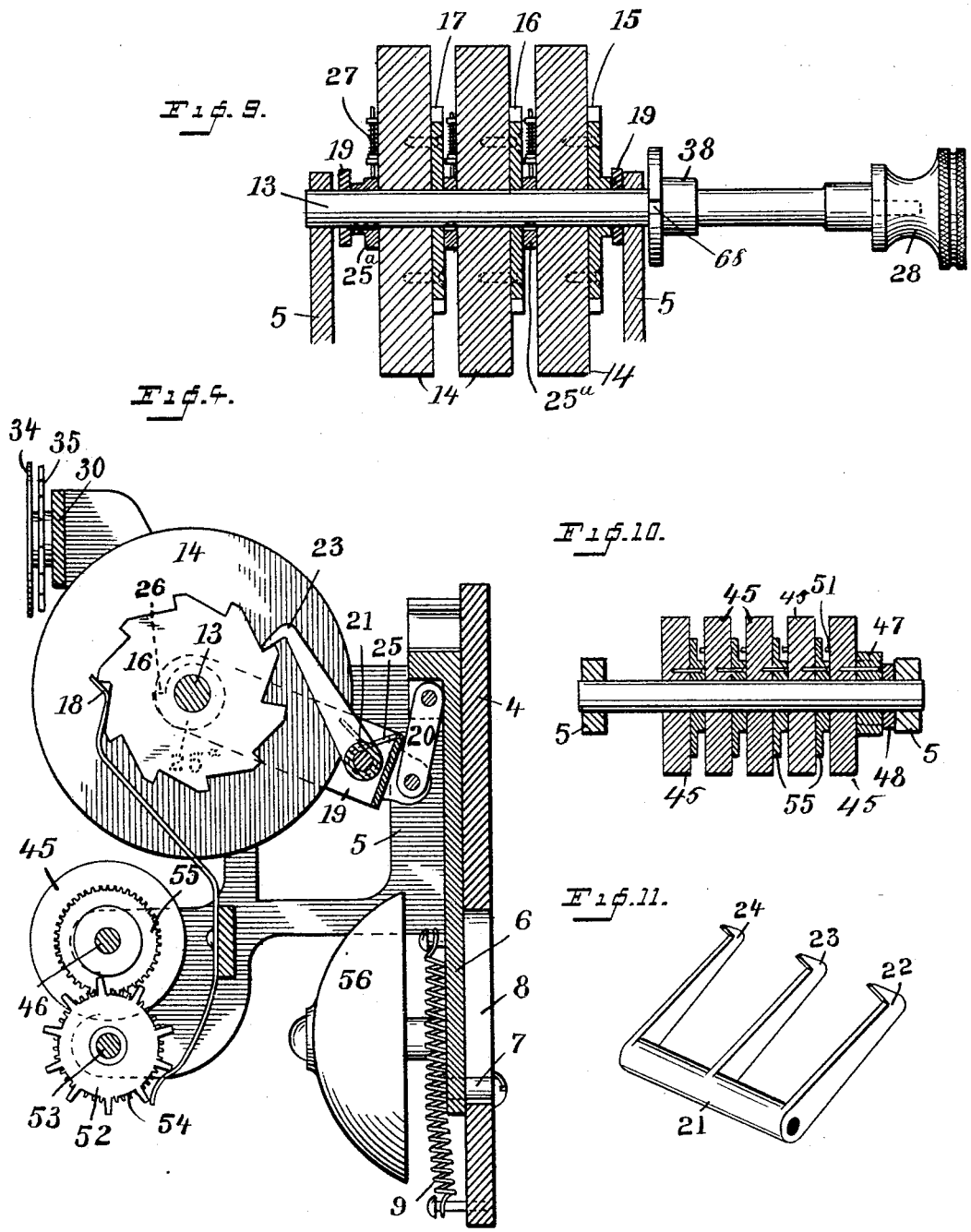

UNITED STATES PATENT OFFICE.

FREDERICK C. BOYD AND RICHARD MARTIN, OF NEW HAVEN, CONNECTICUT.

FARE-REGISTER.

SPECIFICATION forming part of Letters Patent No. 479,388, dated July 19, 1892.

Application filed December 14, 1891. Serial No. 414,910. (No model.)

*To all whom it may concern:*

Be it known that we, FREDERICK C. BOYD and RICHARD MARTIN, citizens of the United States, residing at New Haven, in the county of New Haven and State of Connecticut, have invented certain new and useful Improvements in Fare-Registers; and we do hereby declare the following to be a full, clear, and exact description of the invention, such as will enable others skilled in the art to which it appertains to make and use the same.

This invention relates to certain novel and useful improvements in fare-registers for use in street-cars, omnibuses, and other public conveyances, and has for its objects to provide a register that shall indicate the fares taken as the same are collected by means of mechanism which may readily be turned back to zero at the end of each trip; to provide, also, a register by which the fares received are constantly totalized regardless of the trips; to provide, also, a trip-register, and also mechanism interposed between said trip-register and the fare-indicator, whereby the return of the latter to zero cannot be effected without first operating the trip-register.

With the ends hereinbefore recited in view our invention consists in the construction and combination of elements hereinbefore, fully and in detail explained and then recited in the claims.

In order that those skilled in the art to which our invention appertains may fully understand its construction and means for operation, we will describe the same in detail, reference being had to the accompanying drawings, which form a part of this specification, in which—

Figure 1 is a front elevation; Fig. 2, a front elevation with the case removed; Fig. 3, an end elevation of the mechanism within the case, the latter being sectioned; Fig. 4, a section on the line 4 4 of Fig. 2; Fig. 5, a detail plan view showing the parts which are mounted directly against the back of the case; Fig. 6, a plan view of the trip-register with the numerals omitted and the gearing shown in dotted lines; Fig. 7, an edge view looking in the direction of the small arrow on Fig. 6; Fig. 8, a side elevation of one of the indicating-wheels, showing the small cam and the plunger which co-operates with said cam; Fig. 9, a central section through the indicating-wheels; Fig. 10, a similar section through the registering-train; Fig. 11, a perspective of the triple pawl whereby the indicating-wheels are operated; Fig. 12, a detail end elevation showing the shaft 13 as unlocked and the wheels 14 ready to be turned backward, and Fig. 13 a detached front elevation of the zero-register and the lever whereby it is operated.

The same numerals and letters denote the same parts in each of the figures.

The several parts of our machine are mounted upon a base or back 1 and inclosed by means of a case 2, the face of the latter being provided with openings A, B, and C, through which the registering characters may be read. The case is locked in position by means of a lock 3.

Referring now more particularly to Figs. 3 and 4, 4 denotes a plate secured to the base in any desired manner, and projecting outward from this plate at either side thereof are brackets 5, which support certain of the moving parts. A slide 6 constitutes the prime mover of the register, and this slide lies against the plate 4 and has a movement vertical thereof, whose limit is indicated by the length of a slot 8 in the plate, in which slot runs a stud 7 on the slide. A spring 9 normally holds the slide in the position shown at Fig. 4, and the movement of the slide in opposition to the spring is effected by means of the pull-cord 10, which we prefer to arrange by passing a bight to said cord through a loop 11 on the slide, the branches of the cord extending upward and then outward over pulleys 12, whence they run along the vehicle within easy reach of the conductor. In bearings in the brackets 5 is journaled a shaft 13, upon which are loosely mounted three indicator-wheels 14, each independent of the other and each having secured thereon a ten-toothed ratchet-wheel, which we number, respectively, 15, 16, and 17. (See Fig. 9.)

The indicator-wheels 14 are visible through the face-plate, as shown at Fig. 1, and show the number of passengers carried on each trip, each fare being indicated thereon as collected. They constitute what is commonly called the "trip-register." These ratchet-wheels are similar in the number of their teeth, but differ in their contour—that is to say, the wheel 17 has ten teeth of equal depth and each of the general shape as those shown on the wheels 15 and 16 at Figs. 3 and 4. The wheel 16 (see Fig. 4) has one space between two of the teeth slightly deeper than the other nine spaces. The wheel 15 has its teeth of the ordinary type; but it has one space deeper than the deep space on the wheel 16. These three ratchet-wheels are engaged by detent-springs 18, whereby their free rotation is limited. A yoke 19 has the ends of its arms journaled on the shaft 13 upon each side of the wheels 14. At its rear end and near the center thereof this yoke is connected with the slide 6 by means of the link 20. Inside the yoke a triple-toothed pawl 21 is journaled upon a suitable pin. The teeth on this pawl we denote by 22, 23, and 24, since they differ in length. The tooth 22 engages with the ratchet-wheel 15, the tooth 23 with 16, and the tooth 24 with 17. A helical spring 25 holds the pawl normally in its engaged position.

The operation of this portion of our invention is as follows: When the cord is pulled and the slide raised against the action of spring 9, the yoke 19 is rocked upon its fulcrum 13 and the pawl 21 raised so as to engage through its tooth 22 a tooth upon the ratchet-wheel 15, which it moves one step as the slide is returned to its position by the spring when the cord is released. Normally the tooth 22 is the only one of the three teeth engaging either of the ratchet-wheels; but when said pawl 22 drops into the deep space on the ratchet-wheel 15 it permits the pawl 23 to engage with one of the teeth on the ratchet-wheel 16, thus turning the latter one step at each revolution of the ratchet-wheel 15. When the two deep spaces on 15 and 16 are in conjunction so that the pawls 22 and 23 drop into them, the pawl 24 is thereby permitted to engage a tooth on the ratchet-wheel 17, so as to turn the latter one step. The next movement will of course carry the deep spaces out of conjunction, and therefore the engagement of the tooth 24 and its operation of the ratchet-wheel 17 occurs once only at each ten steps of the wheel 16, or ten revolutions of the wheel 15. This does away with other transfer mechanism between the indicating-wheels.

The shaft 13 carries three snail-cams 25ª, fast thereon and with their perpendicular faces 26 all in the same vertical plane. Each of the ratchet-wheels bears upon its side a small spring-actuated plunger 27 (see Fig. 8) whose nose is in constant engagement with the periphery of said cam 25ª. The wheels 14 all revolve in the direction shown by the arrow on Fig. 8, the shaft normally standing still. This permits the said wheels to revolve freely, each plunger riding upon its cam from the lowest point to the highest point thereof and dropping over the face as it passes the high point. When, however, it is desired to turn the several indicating-wheels 14 back to zero, the shaft 13 is revolved by means of the knob 28, which projects outside the case in such direction that the shoulders on the cams engage against the ends of the plungers 27 one after the other, so as to turn them all to zero. The stop which arrests the wheels 14, consisting of a square tooth taking into a notched disk on the shaft, will be presently referred to and its operation explained. Thus it appears that the indicating-wheels 14 are operated by the slide so as to indicate each fare as it is collected by means of figures at the openings A, and at the end of each trip the indicating-train may be turned back to zero.

Above the aforesaid indicating-train is the zero-register. (Shown in position at the opening B, Figs. 2, 3, and 4, and in detail in Figs. 6 and 7.) Said register denotes the number of times the trip-register has been turned back to zero. It is mounted upon a plate 30, secured to the outer ends of the brackets 5. Said zero-register consists of a units-disk 31, provided with numerals, as shown at Fig. 2, and having secured at its rear side a ten-toothed ratchet-wheel 32. A detent-spring 33 engages the ratchet-teeth.

Co-operating with the disk 31 is a tens-disk 34, whose periphery slightly overlaps the periphery of the disk 31. This disk also (see Fig. 2) bears numerals, and at its rear side has secured thereon a star-wheel 35 having ten teeth. Against the periphery of this star-wheel a detent-spring 36 engages. The disk 31 bears upon its edge a pin 37, which at each revolution of said disk will engage one of the teeth of the star-wheel and turn the latter one step, thereby making of these two disks a train capable of registering up to "99."

The principal indicating-train consisting of the wheels 14 is connected to the zero-register 31 and 34 in such manner that normally the shaft 13 is locked against the operation of turning back the wheels 14 of said indicating-train to zero; but it may be unlocked by the operation of operating the zero-register one step, as will now be explained. Near its outer end the shaft 13 bears a disk 38, having therein a square seat or notch 68, as shown in the end elevation, Fig. 3.

Pivoted above the shaft 13 is an angular lever 39, having on its lower extremity a square-ended tooth 40, which is normally seated in the notch of the disk 38.

41 is a lever, one extremity of which is fulcrumed on the axis of the disk 31. (See Figs. 6 and 7.) The body of this lever extends obliquely outward and terminates in a knob or handle 42, which projects through the side of the case, as shown at Fig. 1. Near its fulcrum-point this lever bears a pawl 43, engaging the ratchet-wheel 32. By raising this lever it is apparent from Fig. 6 that the disk 31 will be operated one step by the pawl 43. At about its upward limit of movement said lever 41 engages the extension of the lever 39 and turns it about its pivotal point sufficiently to withdraw its nose out of engagement with the disk 38, thereby freeing said disk. The operator may then operate the shaft 13 in the manner previously described to return the indicating-wheels 14 to zero. When released, the lever 41 is returned by means of a spring 44 and the nose or tooth 40 by a small spring (not shown) is caused to seat and lock the disk 38 after the latter has made one revolution. It is therefore necessary, in order to turn back the indicating-wheels 14, to first indicate a trip on the disks 31 and 34, and this is designed to serve as a check upon the conductor.

The total number of fares received, irrespective of the separate trips, is registered by means of a train of gears now to be described and whose wheels appear through the openings C at the front of the case. The five indicating-wheels 45 are independently journaled upon a shaft 46, hung in bearings in the brackets 5. One of the wheels 45—the units-wheel, which appears at the right of Fig. 2—has secured upon its face a ten-toothed ratchet-wheel 47. This ratchet-wheel is actuated one tooth at each upward movement of the slide 6 by means of a lever 48, whose outer end is fulcrumed about the shaft 46 and carries a pawl 49, and whose other end is connected by means of a link 50 to the vibratory yoke 19, which, as before stated, is actuated from the slide. The units-wheel, whose operation by the lever has just been explained, carries on the face away from the ratchet-wheel a pin 51, which rotates in the same vertical plane as a star-wheel 52, which is loosely journaled on a shaft 53 below shaft 46. This star-wheel has ten teeth, and at each revolution of the units-wheel is moved one tooth. Secured upon said star-wheel and moving with it is a gear 54, which meshes with a gear 55, secured to the tens-wheel 45, so that, as will be readily understood, each full revolution of the units-wheel will effect one-tenth of a revolution of the tens-wheel through the star-wheel 52 and the gears 54 and 55. By repetitions of this mechanism the hundreds, thousands, and tens-of-thousands wheels are operated at proper intervals to register correctly the whole number of fares received.

For the purpose of ringing a suitable bell 56 as each fare is registered, we provide the slide 6 with a pawl 57, pivoted to the face of the slide and normally engaging a stop 58 thereon. (See Fig. 5.) The pawl may move away from said stop for a purpose presently to be explained; but said movement is made against the action of a spring 59, which constantly engages the pawl. Alongside the slide is pivoted a lever 60, having a recess 61 in its edge and bearing a bell-hammer 62. From the recess toward the bell-hammer the inner face of said lever is oblique. A spring 63 constantly impels said lever toward the bell. When the slide is raised by the pull of the cord to its full limit of movement, the pawl by acting against the edge of the lever forces it outward against the action of the spring 63 until said pawl falls into the recess 61, when the pressure of the pawl being removed the hammer strikes the bell. It will be observed that the bell does not ring until the slide has been moved through its whole throw when the registry of a fare on the totalizing-register 45 is complete and its indication on the wheels 14 assured upon the return motion of the slide. As the slide returns the pawl 57 rises against its spring and passes idly over the oblique face of the lever 60.

For the purpose of compelling the conductor to impart at each pull of the cord a full length movement of the slide we provide the edge of the latter with teeth 64, whose points project beyond the line of the body of the slide and the bottoms of the teeth are also slightly outside said line, as will clearly appear by reference to Fig. 5. With this toothed portion of the slide a pawl 65 is arranged to co-operate. This pawl will swing in both directions about its pivotal point, but is normally held at right angles to the line of movement of the slide by means of a spring 66.

In order that the slide may pass the pawl, the latter turns slightly upon its pivotal point and will drag over the teeth, permitting the slide to pass; but if the slide be moved through only a part of its traverse and is then released the pawl will lock between the teeth and prevent the return of the slide. Whenever all the teeth have passed the pawl, as is the case when the slide has received its full throw, the pawl will return to its normal position and upon the reverse movement of the slide will drag freely over the teeth in the opposite direction.

To briefly recapitulate, the operation of our machine when organized as heretofore described is as follows: A pull upon the operating cord or strap of sufficient force to move the slide throughout its full throw will raise the yoke 19 about its fulcrum to permit of the engagement of the triple pawl 21 with the ratchet-wheels 15, 16, and 17 on the primary indicating-wheels. This upward movement of the yoke through the parts 50, 48, and 49 registers upon the totalizing-register wheels 45, whose sum total may be seen through the openings C in the case. The bell rings at the moment when the slide reaches the top of its throw. The return of the slide, which is effected by the spring 9, permits the triple pawl 21 to turn the ratchet-wheels 15, 16, and 17, and so indicate the fare received upon the wheels 14.

At the end of each trip the number of fares appearing upon the indicating-wheels 14 is taken off by the proper official. Having noted this number, he depresses the lever 41, thereby registering the trip and at the same time unlocking the shaft 13, so as to enable him to turn the indicating-wheels 14 back to zero in the manner hereinbefore described.

The trip-register wheels 31 and 34 are turned backward only at stated intervals and the totalizing-register wheels 45 are probably at the same intervals. This return of the wheels to zero requires no special mechanism, but may be accomplished by rotating the wheels by hand one at a time, the case having been opened for that purpose.

The state of the totalizing-register serves as a check for comparison with the totals received from the several trips when added together and the number of said trips may be obtained from the trip-register.

We claim—

1. In a machine of the character described, the shaft 13, bearing the independently-journaled indicating-wheels constituting the trip-register and having means for engaging and restoring said wheels to zero, as described, of the zero-register, an operating-lever for actuating said zero-register, and a locking-lever normally holding the shaft 13 as against rotation, but adapted to be engaged and withdrawn by the upward movement of the actuating-lever of the zero-register, whereby prior to the return of the indicating-wheels the operation of the zero-register is essential, substantially as specified.

2. In a machine as described, the combination, with the vertically-movable cord-operated slide, of the triple-toothed pawl and means of connection between it and the slide, the trip-register consisting of the wheels 14, independently journaled upon the shaft 13 side by side, means, as described, interposed between said shaft and each of the wheels for turning the latter back to zero by the rotation of the former, a zero-register having a lever for its actuation step by step, and a locking-lever normally holding the shaft 13 as against rotation and lying in the path of the actuating-lever of the zero-register, the whole adapted to operate substantially as described.

3. In a machine of the character described, the combination, with a set of indicating-wheels constituting a trip-register for the indication of the separate fares, a shaft whereon said wheels are independently journaled, a snail-cam and spring-actuated plunger interposed between said shaft and each of the wheels for engaging and turning back the latter by rotation of the former, a locking-lever normally engaging the shaft of the indicating-wheels and preventing the rotation thereof in either direction, a zero-register contiguous to the indicating-train, and an actuating-lever for said zero-register, said lever adapted to release the locking-lever when the zero-register is operated, substantially as described.

4. In a machine of the character specified, a vertically-movable slide constituting the prime mover and a triple-toothed actuating-pawl operated by said slide, in combination with the shaft 13, a series of indicating-wheels independently journaled on said shaft and constituting the trip-register and provided each with a ratchet-wheel in position to be engaged by the triple pawl, the means for connection between said shaft and wheels, consisting of the snail-cams on the shaft and the spring-actuated plungers on the wheels, the zero-registering train adjacent to the indicating-wheels, an operating-lever for the zero-registering train, and a locking-lever normally engaging and holding the notched disk on the shaft 13, but adapted to be engaged and thrown out of its locked position by the operating-lever of the zero-register, substantially as described.

5. The prime mover consisting of the slide and the yoke and the pivoted triple pawl actuated by said prime mover, in combination with the shaft 13, the wheels 14 upon said shaft, the ratchet-wheels borne upon said wheels 14 in the field of operation of the triple pawl, the cams and plungers interposed between the wheels 14 and the shaft, the locking-lever having normal engagement with said shaft 13, the zero-register, and a lever 41 for the operation of said register and adapted, also, at each registering movement to release the shaft 13 by disengaging the locking-lever therefrom, the whole arranged and adapted to operate as described.

In testimony whereof we affix our signatures in presence of two witnesses.

FREDERICK C. BOYD.
RICHARD MARTIN.

Witnesses:
JOHN C. GALLAGHER,
LIVINGSTON W. CLEAVELAND.